April 18, 1933.  V. VOORHEES  1,904,908
HYDROGEN PREPARATION
Filed Aug. 7, 1930
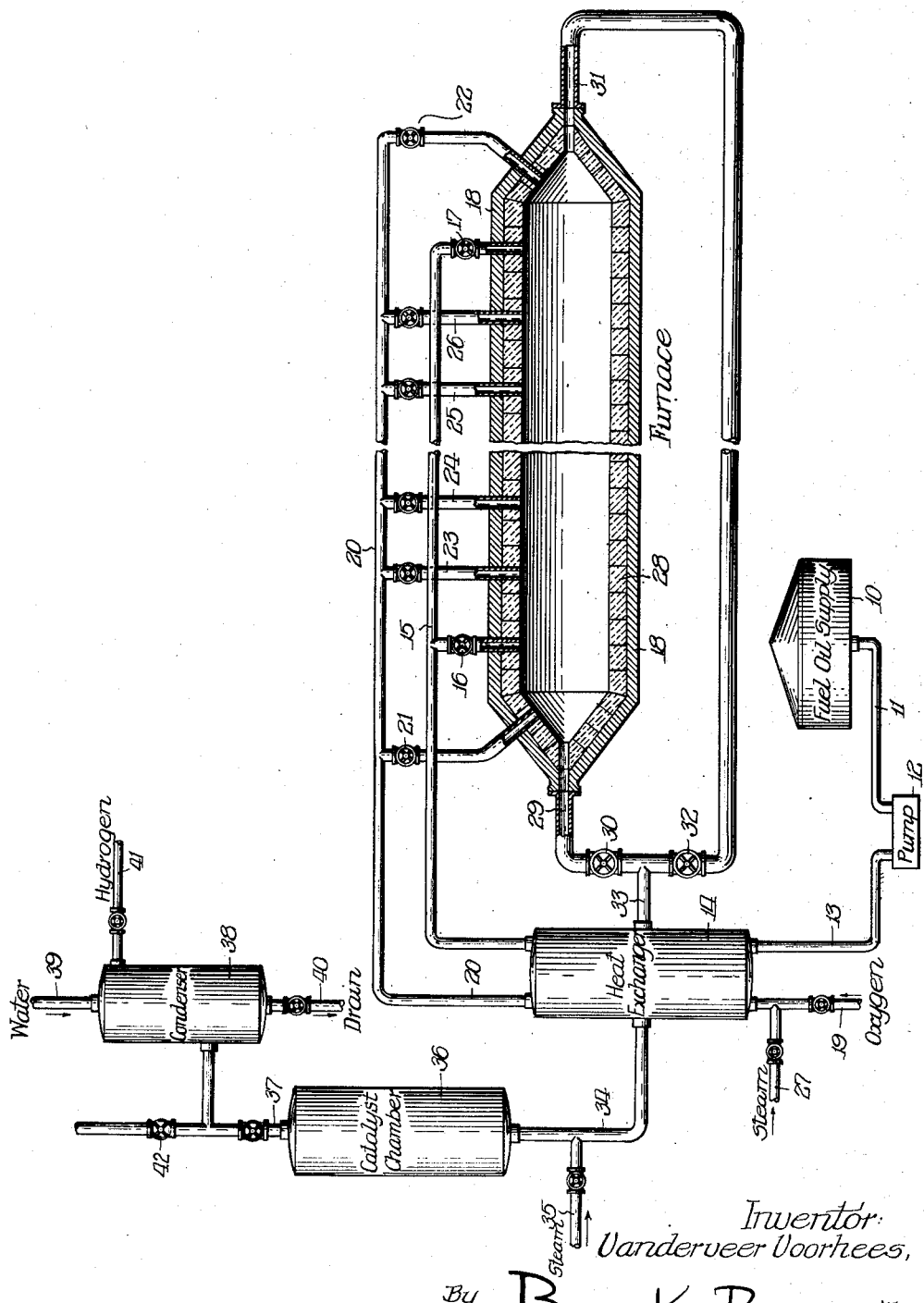
Inventor:
Vanderveer Voorhees,
By Bruce K. Brown, Attys Patented Apr. 18, 1933

1,904,908

UNITED STATES PATENT OFFICE

VANDERVEER VOORHEES, OF HAMMOND, INDIANA, ASSIGNOR TO STANDARD OIL COMPANY, OF CHICAGO, ILLINOIS, A CORPORATION OF INDIANA

HYDROGEN PREPARATION

Application filed August 7, 1930. Serial No. 473,743.

This invention relates to the generation of hydrogen at high pressures.

The object of the invention is to provide an improved process and apparatus wherein the hydrocarbon oil or gas may be partially oxidized at extremely high pressures to yield carbon monoxide and hydrogen. A further object is to generate hydrogen at a pressure of from 200 to 300 atmospheres so that it may be used directly in a hydrogenation system, thereby avoiding the expense and operating difficulties ordinarily encountered in compressing hydrogen for this purpose.

A further object is to provide an improved high pressure reaction chamber with means for controlling the inflow and outflow of fluids whereby a hydrocarbon may be partially oxidized at high velocities without deposition of carbon. Other objects will be apparent from the following detailed description.

In practicing my invention I prefer to employ an elongated, high pressure heat resistant furnace wherein I cause hydrocarbon vapors to react with oxygen or an oxygen-containing gas. A unique feature of this furnace is a provision for preventing stoppage by accumulation of coke therein. This I accomplish by having a discharge port at each end, a hydrocarbon inlet port adjacent each end, a plurality of oxygen inlet ports at spaced intervals between said hydrocarbon inlet ports and an oxygen inlet port between each hydrocarbon inlet port and the adjacent discharge port. I pump fuel oil or other hydrocarbon oil or gas at a pressure of about 3000 lbs. through one of the hydrocarbon inlet ports, inject enough oxygen between this port and the adjacent outlet port (which is closed) to avoid stoppage of this outlet by carbon depositions, and gradually effect a partial oxidation of the hydrocarbon as it moves through the elongated chamber and meets successive increments of oxygen, the final mixture of hydrogen and carbon monoxide being discharged through the opposite discharge port. The carbon monoxide may be converted into hydrogen by a treatment with steam in the presence of a suitable catalyst at about 550° C. and the resulting hydrogen may be scrubbed and introduced into a hydrogenation system at a pressure of 200 to 300 atmospheres, thereby avoiding the necessity of compressing hydrogen gas.

My invention will be more clearly understood from the description of a preferred embodiment which is illustrated in the accompanying drawing wherein my improved reaction chamber is shown in vertical section and the remaining parts of the system are indicated diagrammatically.

Fuel oil, hydrocarbon gases or other source of gaseous or liquid hydrocarbons are conducted from a suitable supply tank 10, through pipe 11, pump 12, pipe 13, heat exchanger 14, and pipe 15 to hydrocarbon inlet pipes 16 and 17, which are arranged near the ends of the high pressure reaction chamber 18. Oxygen or oxygen-containing gas is supplied at a pressure slightly above 3000 lbs. through pipe 19, heat exchanger 14, pipe 20, end conduits 21 and 22, and intermediate conduits 23, 24, 25 and 26. Steam may be introduced in measured amounts at the same pressure as the oxygen through pipe 27.

The reaction chamber is preferably a steel tube about 10 to 20 ft. in length and 8 to 15 in. in diameter. It is lined with suitable fire brick or other refractory heat insulating material and is provided at one end with a discharge conduit 29 and valve 30 and at the other end with discharge conduit 31 and valve 32. The heat exchanger conduits, pipes and reaction chamber are preferably made of one of the well known chromium alloys but I do not limit myself to any particular composition. They are also covered by a suitable heat insulating material (not shown) as, for example, the asbestos covering commonly employed in such work.

Conduits 29 and 31 lead through pipe 33 and heat exchanger 14, to pipe 34 into which steam is injected through pipe 35,—the mixture of gases containing carbon monoxide and steam being introduced into a catalyst chamber 36 at a pressure of about 2700 lbs.

and a temperature of about 550° C. From this chamber the carbon monoxide produced in the first reaction chamber is oxidized by the steam to yield carbon dioxide and hydrogen which, in turn, is conducted by pipe 37 to condenser 38 wherein the gases are cooled and excess steam is condensed by direct contact with water or other liquid introduced by pipe 39 and withdrawn through pipe 40. The water also dissolves out carbon dioxide and other undesirable impurities. The purified hydrogen leaves the scrubber through pipe 41 at a pressure of about 200 to 300 atmospheres and it may be introduced directly into a hydrogenation system for converting low grade petroleum oils into valuable lubricating oils and/or gasoline. In some cases it may not be necessary to remove the carbon dioxide from the hydrogen and the hydrogen may be introduced into the hydrogenation system directly by a pipe 42.

The operation of my invention will be obvious from the above description. The gas oil or other hydrocarbon may, for instance, be injected into catalyst chamber 18 through conduit 16, conduits 17 and 29 being closed. The oxygen introduced by conduit 21 maintains a high temperature at the mouth of conduit 29 and prevents carbon deposition at this point. As the hydrocarbon moves along the reaction chamber it meets more and more oxygen and becomes hotter and hotter until finally it reaches a temperature of 750°–1000° C. at a pressure of about 3000 lbs. By introducing the oxygen in small increments at a plurality of points, excessively high local temperatures are avoided. Oxygen is introduced in quantities sufficient to convert all the carbon into carbon monoxide, the reaction being generally

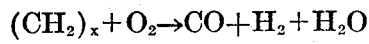

$$(CH_2)_x + O_2 \rightarrow CO + H_2 + H_2O$$

Additional oxygen results in the formation of additional water.

The water produced in this reaction acts on the carbon which is deposited as the result of cracking to yield further hydrogen and carbon monoxide (water gas reaction). The final gases, chiefly hydrogen and carbon monoxide, are withdrawn through the heat exchanger mixed with steam and contacted with a catalyst at a lower temperature whereby the carbon monoxide is oxidized by the steam to yield carbon dioxide and hydrogen. The hydrogen may be scrubbed and introduced directly into a hydrogenation system at 200 to 300 atmospheres, as above stated.

When the converter has operated for a period of time, carbon tends to deposit near and obstruct the hydrocarbon inlet conduit. When this occurs I close the valves 16, 21 and 32 and open the valves 17, 22 and 30. This causes the reaction in the chamber to proceed in the opposite direction so that the other end of the chamber becomes heated and the deposited carbon is removed by the combined action of steam and oxygen. By alternating the feed and discharge from one end to the other I may obtain substantially continuous operation. The partial oxidation of hydrocarbons to yield carbon monoxide and hydrogen does not produce much excess heat and I therefore cannot ordinarily use appreciable amounts of steam in reaction chamber 18. As an additional temperature control and source of hydrogen I may, in certain instances, mix a small amount of steam from pipe 27 with the oxygen which enters the system through pipe 19. The amount of steam must be kept low enough to insure the conversion of hydrocarbon into hydrogen and carbon monoxide.

While I have shown in the accompanying drawing a system wherein oxygen is introduced into conduits spaced about 1 to 3 ft. apart, it is understood that I do not limit myself to this particular means of obtaining a gradual partial oxidation. Neither do I limit myself to the temperatures, pressures or other details of operation hereinabove set forth except as defined by the following claims.

I claim:

1. The method of obtaining hydrogen at a pressure of about 200 to 300 atmospheres which comprises partially oxidizing a hydrocarbon at a pressure slightly higher than the desired pressure and reacting the resulting carbon monoxide with steam in the presence of a catalyst without substantial reduction in pressure.

2. The method of generating hydrogen at pressures of about 200–300 atmospheres which comprises continuously introducing a hydrocarbon and an oxidizing gas into a pressure zone whereby carbon monoxide, hydrogen and water are formed, and contacting said carbon monoxide with steam for producing hydrogen without appreciably diminishing the pressure whereby the resulting hydrogen is at a pressure of about 200 to 300 atmospheres.

Signed this 1st day of August, 1930, at Chicago, in the county of Cook, State of Illinois.

VANDERVEER VOORHEES.